(12) United States Patent
Snyder, II et al.

(10) Patent No.: US 9,678,717 B2
(45) Date of Patent: Jun. 13, 2017

(54) DISTRIBUTING RESOURCE REQUESTS IN A COMPUTING SYSTEM

(71) Applicant: Cavium, Inc., San Jose, CA (US)

(72) Inventors: Wilson P. Snyder, II, Holliston, MA (US); Varada Ogale, Framingham, MA (US); Anna Kujtkowski, Rochdale, MA (US); Albert Ma, Belmont, MA (US)

(73) Assignee: CAVIUM, INC., San Jose, CA (US)

( * ) Notice: Subject to any disclaimer, the term of this patent is extended or adjusted under 35 U.S.C. 154(b) by 0 days.

(21) Appl. No.: 14/941,082

(22) Filed: Nov. 13, 2015

(65) Prior Publication Data

US 2016/0139883 A1    May 19, 2016

Related U.S. Application Data

(60) Provisional application No. 62/079,933, filed on Nov. 14, 2014.

(51) Int. Cl.
*G06F 9/46* (2006.01)
*G06F 7/58* (2006.01)
*G06F 12/0802* (2016.01)

(52) U.S. Cl.
CPC .............. *G06F 7/582* (2013.01); *G06F 7/588* (2013.01); *G06F 12/0802* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 2012/0185522 A1* | 7/2012 | Aharoni | G06F 7/58 708/250 |
| 2015/0356008 A1* | 12/2015 | Sere | G06F 12/1408 711/167 |
| 2016/0085672 A1* | 3/2016 | Fenney | G06F 12/0802 711/3 |

* cited by examiner

*Primary Examiner* — Sisley Kim
(74) *Attorney, Agent, or Firm* — Brown Rudnick LLP; Nikhil Patel

(57) ABSTRACT

In an embodiment, a method include, in a hardware processor, producing, by a block of hardware logic resources, a constrained randomly generated or pseudo-randomly generated number (CRGN) based on a bit mask stored in a register memory.

19 Claims, 8 Drawing Sheets

DISTRIBUTING RESOURCE REQUESTS IN A COMPUTING SYSTEM

RELATED APPLICATIONS

This application claims the benefit of priority of U.S. Provisional Application No. 62/079,933 filed Nov. 14, 2014, the disclosure of which is incorporated herein by reference in its entirety.

BACKGROUND

In a computing system, many virtual machines, devices or cores may attempt to access shared resources. These resources can be busses, interfaces, cache memories, or other hardware or software shared resources. Further, each virtual machine, device or core may be shared among multiple users/processes.

SUMMARY

In an embodiment, a method include, in a hardware processor, producing, by a block of hardware logic resources, a constrained randomly generated or pseudo-randomly generated number (CRGN) based on a bit mask stored in a register memory. The method can includes outputting the CRGN to a resource selection unit configured to select a portion of the resource based on the outputted CRGN.

In an embodiment, the resource can be a cache memory. The portion of the cache memory can be a bank of the cache memory. The resource can also be a bus. Selecting the portion of the resource can include selecting a portion of multiplexed time of the resource. Selecting a portion of the resource can be based on the CRGN and at least one additional random or pseudo-random bit. Producing the CRGN can also include, beginning at an index of the bit mask based on the a randomly generated number (RGN), searching for a bit of the bitmask having a particular value and, upon finding the bit having the particular value, producing the CRGN based on an index of the bit.

In an embodiment, the bit mask can be stored in a context file.

In an embodiment, a system includes a register memory storing a bit mask, and a block of hardware logic resources configured to produce a constrained randomly generated or pseudo-randomly generated number (CRGN) based on the bit mask stored in the register memory.

In an embodiment, the system further includes a resource selection unit. The block of hardware logic resources is configured to output the CRGN to the resource selection unit. The resource selection unit is configured to select a resource of a hardware processor based on the outputted CRGN.

In an embodiment, a resource selection unit is configured to select a portion of a resource based on the CRGN. The resource can be a cache memory. The portion of the cache memory can be a bank of the cache memory. The resource selection unit can be further configured to select a portion of the resource based on the CRGN and at least one additional random or pseudo-random bit.

In an embodiment, the block of hardware resources can be further configured to produce the CRGN by, beginning at an index of the bit mask based on a randomly generated number (RGN), searching for a bit of the bitmask having a particular value, and, upon finding the bit having the particular value, producing the CRGN based on an index of the bit.

In an embodiment, the bit mask is stored in a context file.

In an embodiment, a method of providing quality of service to at least one resource of a hardware processor includes providing, in a memory of the hardware processor, a context including at least one quality of service parameter and partitioning access to the at least one resource of the hardware processor based on the quality of service parameter of the context, a device identifier, a virtual machine identifier, and the context.

In an embodiment, the at least one resource is at least one of a cache and a bus. The quality of service parameter is at least one of a priority information parameter and a partition information parameter.

In an embodiment, partitioning access to the at least one resource includes at least one of (1) providing access to the at least one resource having a quality of service parameter indicating a priority above a threshold, (2) refusing access to the at least one resource having a quality of service parameter indicating a priority below a threshold, (3) partitioning at least one of lanes and banks of the at least one resource spatially, (4) time multiplexing the at least one resource, or (5) providing access to all of the at least one resource based on its context.

In an embodiment, partitioning access to the at least one resource of the hardware processor is further based on a bitmask stored in a memory of the hardware processor.

In an embodiment, the at least one resource is a cache, and partitioning access to the at least one resource by allowing access to a particular bank of the cache. The bank of the cache is chosen based on the bitmask.

In an embodiment, the method includes receiving a particular request of a plurality of requests for virtual memory from a device and translating the particular request to the context stored in the memory of the hardware processor. Partitioning access to the at least one resource includes prioritizing the particular request among the plurality of requests based on the quality of service parameter of the context.

In an embodiment, a system for of providing quality of service to at least one resource of a hardware processor includes a memory of the hardware processor providing a context including at least one quality of service parameter and a quality of service module configured to partition access to the at least one resource of the hardware processor based on the quality of service parameter of the context, a device identifier, a virtual machine identifier, and the context.

In an embodiment, the system includes at least one resource is at least one of a cache and a bus. The quality of service parameter is at least one of a priority information parameter and a partition information parameter.

In an embodiment, partitioning access to the at least one resource includes at least one of (1) providing access to the at least one resource having a quality of service parameter indicating a priority above a threshold, (2) refusing access to the at least one resource having a quality of service parameter indicating a priority below a threshold, (3) partitioning at least one of lanes and banks of the at least one resource spatially, (4) time multiplexing the at least one resource, or (5) providing access to all of the at least one resource based on its context.

In an embodiment, partitioning access to the at least one resource of the hardware processor is further based on a bitmask stored in a memory of the hardware processor.

In an embodiment, the at least one resource is a cache, and the quality of service module is further configured to partition access to the at least one resource by allowing access to a particular bank of the cache. The bank of the cache is chosen based on the bitmask.

In an embodiment, the system includes a memory management module configured to receive a particular request of a plurality of requests for virtual memory from a device and translate the particular request to the context stored in the memory of the hardware processor. The quality of service module is further configured to partition access to the at least one resource by prioritizing the particular request among the plurality of requests based on the quality of service parameter of the context

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A processor can interface with other devices, such as network interfaces, hard drive controllers, or coprocessors. When one of these devices interfaces with the processor, the processor has to translate memory addresses of the device to a memory address, called a virtual memory address, of the processor, called a physical address. The device may further be running one or more processes, such a web browser or email program. A system memory management unit (SMMU) (sometimes also called a memory management unit (MMU)), translates virtual addresses from the device to a physical address on the processor. The SMMU translates the virtual address of the advice based on the virtual address itself, as well as other factors such as the device and the process using the virtual address. The present disclosure describes an improvement to the SMMU.

In some situations, a device or process may need higher priority than another device or process. As an example, an administrator may give certain computers higher priority for resources than others, so that those computers can perform faster. As another example, a certain type of process, such as video streaming or video teleconferencing, may be given higher priority over other processes, such as web browsing or downloading files. The processor described herein can give higher priority for resources based on particular device or process contexts. In particular, the processor described herein can give translation of virtual-to-physical memory addresses higher priority based on these device or process contexts.

Figure 1:
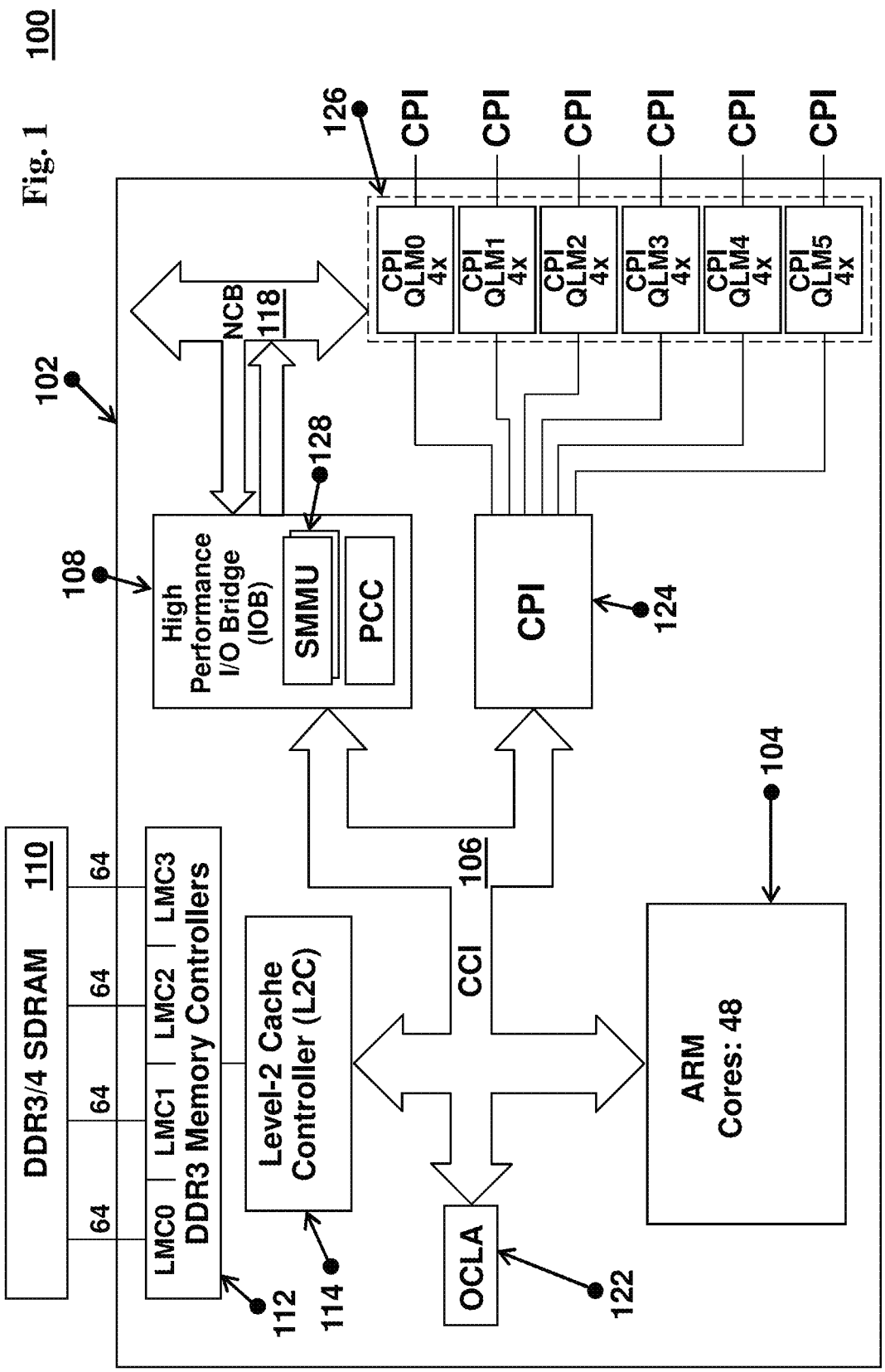
FIG. 1 is a block diagram illustrating an example embodiment of a hardware processor.

FIG. 1 is a block diagram 100 illustrating an example embodiment of a hardware processor 102. In an embodiment, the processor 102 can be the ThunderX™ designed by Cavium™, Inc.

The processor 102 is addresses the needs of scale out data centers and the trends in large computing infrastructures. The processor 102 integrates a plurality of cores 104, for example including high performance 64-bit ARMv8 (Advanced RISC (Reduced Instruction Set Computing) Machines) processors, a cache-coherent interconnect 106, hardware accelerators designed for large data applications, virtualized networking, and switching functions, an on-chip logic analyzer unit (OCLA) 122 and scalable input/output (I/O). The processor 102 offers best-in-class levels of performance and integration. The processor further integrates a high performance I/O bridge (IOB) 108 in combination with a near-coprocessor bus (NCB) 118 to enable I/O and coprocessor devices to communicate to memory and the cores 104.

Emerging data center applications have at least the following characteristics: (1) large scale (scaling to thousands of processors), (2) virtualization—the ability to support multiple separate virtualized domains and (3) big data sets.

The processor 102 includes custom designed ARMv8 cores 104. Area efficiency of the cores 104 allows the processor 102 to include 48 cores, in one embodiment. The high core density enables data-center systems that require a large numbers of cores to use fewer processors 102 than solutions employing other processors. The processor 102 cores 104 support efficient execution of integer, floating point, and vector workloads. A 16 MB shared Level-2 cache 114, operatively coupled to a memory controller 112 and memory 110, provides a fully cache coherent software environment. In addition, the processor 102 can be connected to other instances of processors 102 by a coherent fabric to provide, for example, up to 192 cores and 1 TB of cache-coherent memory.

Multiple processors 102 are typically connected by a data-center fabric to build large data-center systems. This fabric is typically constructed with external switches and networking infrastructure. The present processor 102 contains a built-in switch that reduces the number of external switches required to connect processors 102 and also increases the flexibility of the data-center network design. For example, the processor's 102 10 Gb Ethernet ports 126 (e.g., Serializer/Deserializer (SerDes) Quad-Lane Modules (QLMs)) can be used to connect clusters of processors 102 together without employing external switches in a flexible topology, for example, by employing the Coherent Processor Interconnect (CPI) 124. This reduces a data center solution's overall component count, power consumption, and physical space, and increases system reliability. In an example embodiment, the CPI 124 can receive data from and send data to other processors via the SerDes QLMs 126.

Shared data-center infrastructure, such as cloud-computing environments, place specific demands on virtualization. Shared infrastructures provide security and quality-of-service guarantees to each user at a low cost by amortizing the operating and capital expense over a large number of users. The processor 102 provides specific features to support virtualized environments. The processor's 102 ARMv8 core 104 supports a fully virtualized software environment for guest operating systems.

A System Memory-Management Unit (SMMU) 128 (also known as a I/O Memory Management Unit (IOMMU)) provides translation and isolation of I/O addresses of different devices and guest operating systems in response to an I/O request (e.g., a memory read or write). The SMMU 128 is responsible for translating read/write transaction virtual addresses, intermediate physical addresses, or physical addresses into a system physical address. The SMMU 128 receives a read/write transaction from the NCB 118, the transaction including an untranslated address (e.g., a virtual address) and a stream ID that indicates the requesting device. The SMMU 128 converts the untranslated address and stream ID to a physical memory address. The IOB then uses the physical address to complete the I/O request at memory 110.

The processor's 102 virtualized network interface controllers (VNICs) allow virtual machines within a single processor 102 and between multiple processors 102 to communicate directly without a software virtual switch. The processor's 102 virtualized network interface frees up more computation resources for the applications since software is relieved from the burden of emulating network functions between virtual machines.

Administering the large data-center network is another challenge for large, shared infrastructure environments. The processor's 102 integrated switch and VNICs provide a software-defined network that allows system administrators to build virtual networks that provide security and QoS guarantees. The processor's 102 switch supports software-configurable encapsulations, thereby allowing a system administrator to both support and provision a large global network and provide client virtual environments their own private networks.

Large data applications often require streaming access to data. The processor's 102 built-in SATA and PCIe interfaces can stream data to and from storage devices through on-chip DMA accelerators. Streaming data may be processed in a high-performance energy-efficient manner by using the built-in data compression/decompression and regular-expression engines. The large amounts of data present in "Big Data" applications lends itself to hardware acceleration where repetitive tasks may be performed in a more energy-efficient manner than by software alone. The processor's 102 integrated SATA and PCIe interfaces facilitate the construction of large data-storage nodes with minimal board footprint and component count. SATA drives can be directly connected to the processor's 102 integrated SATA controllers, creating a compact high-capacity storage node. The integrated PCIe controllers with configurable lane width enable connectivity to other storage peripherals such as SAS controllers and solid-state storage.

Figure 2:
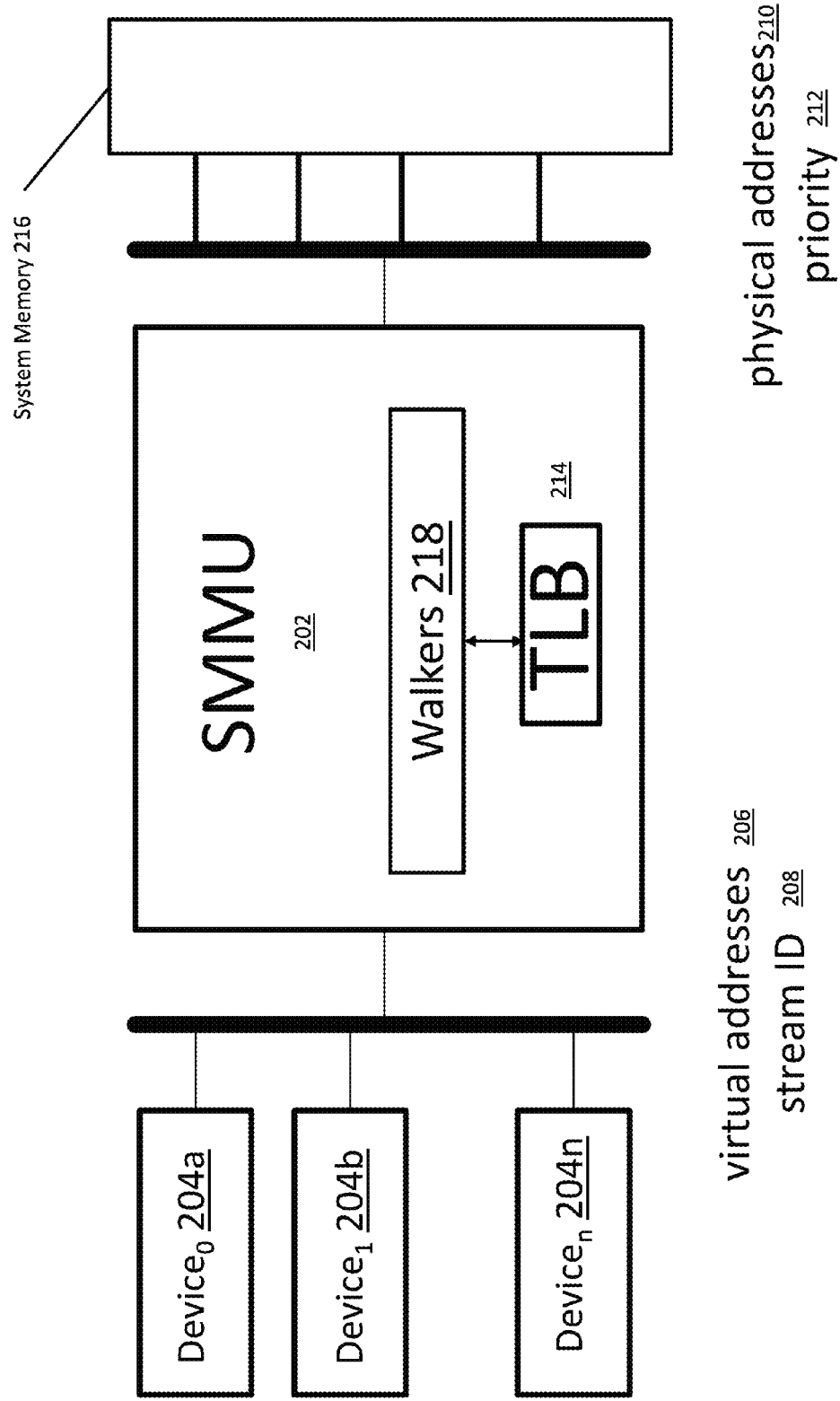
FIG. 2 is a block diagram illustrating an example embodiment of the present disclosure.

FIG. 2 is a block diagram 200 illustrating an example embodiment of the present disclosure. A System Memory Management Unit (SMMU) 202 receives a corresponding virtual addresses 206 and stream IDs 208 from a plurality of devices 204a-n. Each device can be a network interface of a computer, laptop, server, tablet, or smart phone. Each device can also be a hard drive or processor/coprocessor of a computer, laptop, server, tablet, or smart phone. Each stream ID can represent a process such as a web browser, email application, smart phone app, tablet app, or etc. The SMMU 202 converts the virtual addresses 206 and stream IDs 208 to a physical address 210 and a priority 212 based on registers of the SMMU 202 and a transition lookaside buffer (TLB) 214, which is a cache of recently performed virtual-to-physical address conversions. If the TLB 214 does not store the requested virtual-to-physical address conversion, the SMMU 202 includes page walkers 218 which perform the conversion and then store it in the TLB 214 for later use.

A read/write transaction arrives at the IOB attached to the head of that NCB. The IOB may bypass the SMMU 202 process entirely in certain circumstances, based on a tag received by the SMMU 202. When bypassed, the "translated" address is the address as provided by the device with the address bit <48> and the stream ID ignored. However, in describing the function of the SMMU 202, it is assumed that the SMMU 202 translates the address from the device.

The SMMU 202 also uses the stream identifier as a secure context identifier, and looks up a corresponding bit in a secure state determination array to determine if the memory access should be promoted to secure. Some devices, such as the SMMU 202, have other criteria that allow setting secure mode even if this bit is not set. The bit also promotes any interrupt passing through the SMMU 202 to secure mode.

The SMMU 202 compares the stream identifier to all of the entries of stream matchers to determine a context number, or determine that no context matches. The SMMU 202 looks up the context/virtual address, secure state, and address in the TLB 214, which is a cache memory storing context to physical address translations. The TLB 214 is a 1024 entry structure with 32 ways (which are sub-areas of the TLB 214). If the transaction hits, the TLB 214 outputs the translated physical address. If the transaction misses, the physical address is translated from the context, for example, by page walkers 218. The page walkers 218 of the SMMU 202 walk the page table to find the virtual-to-physical address conversion. This process can be accelerated by a 256-entry walker-cache unit (WCU) (not shown) which caches intermediate translations. If the WCU misses, the page tables are read from the L2C (e.g., cache 114 of FIG. 1) or DRAM (e.g., memory 110 of FIG. 1). Page table accesses may violate secure mode constraints, however, which can create an external fault. If appropriate, the translation and state are saved back to the TLB 214 and/or WCU (not shown) of the page walkers 218. The SMMU 202 returns the translation to read/write to system memory 216, either directly or through a cache.

A context stores information specific to a particular process or a device/process combination. The context may describe, for example, how to perform memory translation in a virtual memory system. Context information may be stored in a memory, in registers, on devices or in any other location. For example, context information can be stored in memory registers of the SMMU 202.

The SMMU 202 can receive multiple requests from the devices 204a-n. Prioritizing or partitioning shared resources (e.g., busses, cache memories, interfaces, etc.) within the SMMU 202 to handle the requests from the devices 204a-n can improve Quality of Service (QoS). Prioritization can be based on the combination of devices/cores and users/processes.

The SMMU 202 described in the present disclosure can dynamically assign a request priority information and/or partition information in a computing system possessing multiple contexts. A context stores information specific to a particular process or a device/process combination. Examples of information stored in a context can be a virtual machine ID and process ID. The context may inform, for example, how to perform memory translation in a virtual memory system. Context information may be stored in a memory, in registers, on devices or in any other location. For example, context information can be stored in memory registers of the SMMU 202. In the present disclosure, each context stores transaction priority value(s) and/or cache placement partition information. This priority/partition information is assigned for any request issued in the corresponding context.

Priority can be employed in many ways. For example, if a bus receives two requests simultaneously, it can choose the request having a higher priority. As another example, if a memory buffer is filled to a certain threshold, it can refuse requests below a certain priority.

Partition information can be employed in several ways. For example, a bus with multiple lanes can be partitioned (spatially) among the contexts, with particular context(s) being assigned particular lanes. Alternatively, the bus can be time multiplexed, or partitioned (temporally) among the contexts, such that each context can use the bus during a certain time period (e.g., one of many rotating time periods). A cache can be spatially partitioned, such that requests from certain contexts can only be received by or written to a subset of entries (e.g., certain banks) of the cache. Alternatively, a context can also be guaranteed unfettered access to a certain range of entries, if, for example, it is a high priority context that may require more use of the cache than other contexts.

The SMMU 202 includes an implementation of this disclosure. A person of ordinary skill in the art can recognize that implementations of this disclosure are not limited to the SMMU 202. The present disclosure can be implemented in any situation where QoS is needed. However, the SMMU 202 provides an exemplary use case of the present disclosure.

The SMMU 202 receives virtual memory requests on behalf of devices 204a-n and translates the virtual memory requests to physical memory addresses 210. Each SMMU 202 contains a TLB 214, which is a cache memory configured to store recent virtual memory translations. As the SMMU 202 completes each virtual memory translation, the SMMU 202 stores the virtual-to-physical address translation in the TLB 214 so that later translations to the same page are fast. In an embodiment, the TLB 214 of the SMMU 202 can store translations for up to 128 contexts. In an embodiment, the processor 102 of FIG. 1 includes four SMMUs 202. The processor 102 of FIG. 1 therefore can store 512 translation contexts across the TLBs 214 of the four SMMUs 202.

The information added to the contexts in the context banks stored in the SMMU 202 is shown below in Table 1. Each context corresponds with an SMMU Context Auxiliary Control Register (ACTLR) including fields to implement QoS. In one example implementation, bits[15:0] of the ACTLR is called DIS_BNK (e.g., disabled banks), and is a bitmask of sections of the TLB 214 to disable for fills caused by transactions to the context. As each translation completes, DIS_BNK is passed to the TLB 214 to control where the translation can be saved. For example, in this implementation, the TLB 214 can include 16 banks, each bank corresponding to a bit of the DIS_BNK bitmask. The banks of the TLB 214 indicated by DIS_BNK for the particular context are not written to, but other banks of the TLB 214 can be written to. Bits [31:28] of ACTLR is called QOS, which is a 4-bit number from 0-15 that indicates the priority of the request when passed to the memory system.

TABLE 1

SMMU Context Auxiliary Control Register

| Bit Position | Field Name | Access | Reset Value | Typical Value | Field Description |
|---|---|---|---|---|---|
| <31:28> | QOS | R/W | 0x0 | — | L2C quality-of-service value to use for transactions to this context. |
| <27:16> | — | RAZ | — | — | Reserved |
| <15:0> | DIS_BNK | R/W | 0x0 | 0x0 | Bitmask of sections of TLB to disable for fills caused by transactions to this context. May be used to partition the TLB to achieve QOS; note the WCU is not likewise partitioned. If a context is marked secure but accessed insecurely, then this register is RAZ/WI. |

The SMMU also includes two additional registers, Auxiliary Control Register (ACR) and the Secure Auxiliary Control Register (SACR) that are outside of the context banks Bits [31:28] of each register is called QOS, which is a 4-bit priority used by requests that are not translated. Bits [27:24] of each register is a 4-bit number called QOS_WALK, which is the priority used for memory requests made by the page table walkers within the SMMU 202. The ACR register is used for non-secure accesses, while the SACR register is used for secure accesses.

TABLE 2

SMMU (Secure) Auxiliary Control Register

| Bit Position | Field Name | Access | Reset Value | Typical Value | Field Description |
|---|---|---|---|---|---|
| <31:28> | QOS | R/W | 0x0 | — | L2C quality-of-service value to use for standard transactions that are not by a specific context, and so SMMU(0 . . . 3)_CB(0 . . . 127)_ACTLR[QOS] is not applicable. |

TABLE 2-continued

SMMU (Secure) Auxiliary Control Register

| Bit Position | Field Name | Access | Reset Value | Typical Value | Field Description |
|---|---|---|---|---|---|
| <27:24> | QOS_WALK | R/W | 0x0 | 0x0 | L2C quality-of-service value to use for page table walks. For optimal performance, this typically would be set to the most preferential QoS value of zero. |
| <23:0> | — | RAZ | — | — | Reserved |

In another embodiment, a mechanism enforces cache partitions given a partition bitmask, as provided by a context as previously described. In an associative cache, any particular piece of data may be placed in any of several locations, which are commonly called "ways." When a new piece of data is to be saved, one of these ways is selected for replacement. Currently, many methods can be employed to select a way for replacement. For example, one method is to choose a way at random. In another example, hybrid random methods are employed such that some subset of way's address bits are chosen at random while other of the way's address bits are chosen through another method.

In the present disclosure, random number generation (RGN) or pseudo-RGN is constrained such that values which are disabled by the partition bitmask of the context are not used. For example, suppose selecting a way uses m constrained random bits and that the number of bits in the partition bitmask is $2^n$, where m≥n. First, the system generates an m-bit random or pseudo-random number. The upper m−n bits are used without modification. The lower n bits index the $2^n$-bit partition bitmask as a starting position for a search. From that indexed location, if the indexed location is not an allowed bit (e.g., 0-bit) the system cycles through the bit mask in a particular direction until it finds a first allowed bit (e.g., 0-bit). If necessary, the system wraps around the bitmask modularly until it finds the first allowed bit. The index of the position where the system finds the first allowed bit then becomes the lower n-bits of the constrained random number. For example, if the first allowed bit is found at position 11, then the lower n-bits is 11 (decimal), or 1011 in binary.

The SMMU's 202 TLB 214 implements an embodiment of the technology described in this disclosure. The TLB 214 is logically organized in a number of sections (e.g., 32 sections in an embodiment). Each section of the TLB 214 includes a particular number of ways. Data can reside in any section (subject to the partition mask) and in any way within each section. The constrained RGN or pseudo-RGN, based on the 16-bit DIS_BNK mask as described above, chooses the replacement section of the TLB 214. A way select unit can further select the way of the replacement section.

Figure 3:
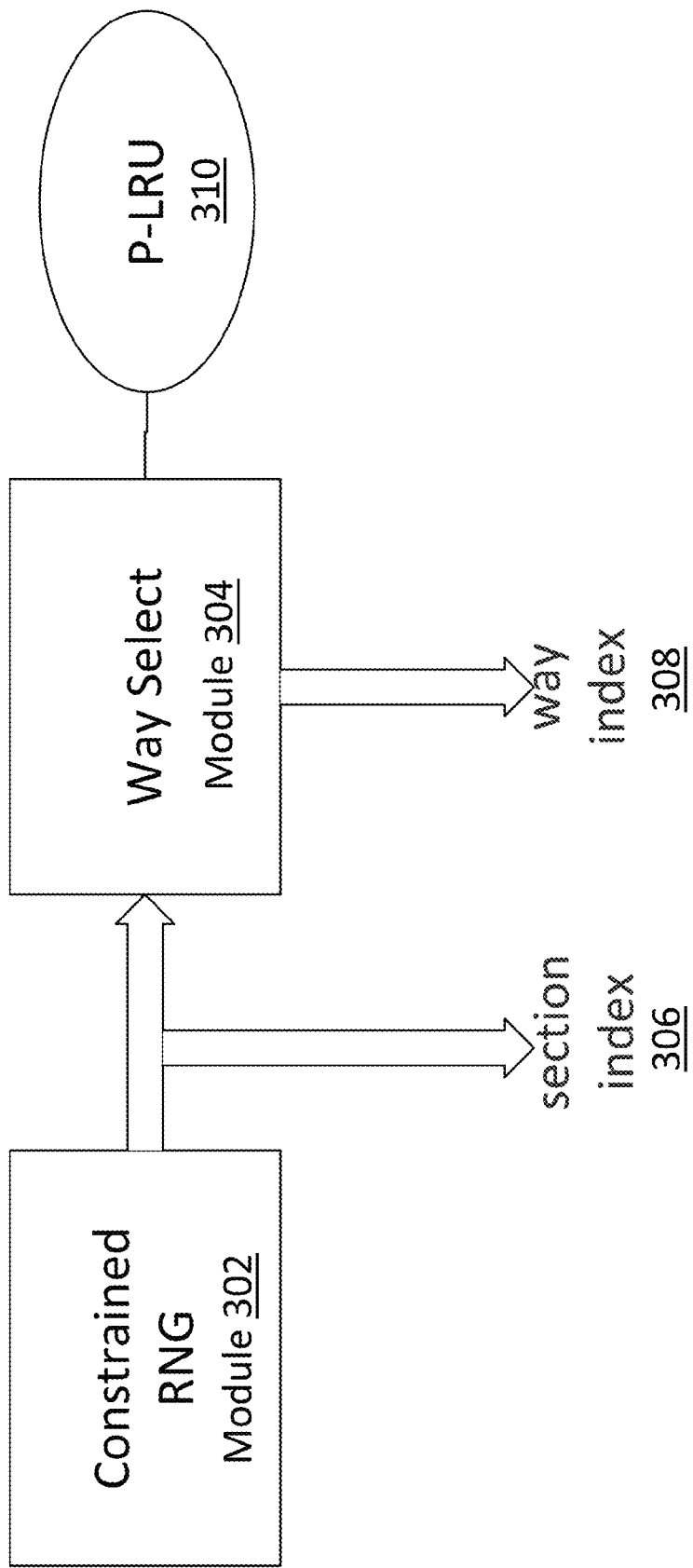
FIG. 3 is a diagram illustrating an example embodiment of the present disclosure.

FIG. 3 is a diagram 300 illustrating an example embodiment of the present disclosure. A constrained RGN module 302 generates a constrained RGN or pseudo-RGN, as described above. The constrained RGN or pseudo-RGN, or a subset thereof, is a section index 306 used to select a portion of the resource, such as the section of the TLB 214 cache memory of FIG. 2. A person of ordinary skill in the art can recognize that the section index 306 can select portions of any memory resource, or select another resource such as a bus or processor (e.g., a physical portion of a spatially divided bus, or access to a time-multiplexed bus or processor).

A way select module 304, based on the constrained RGN or pseudo-RGN generated, generates a way index 308 to select a way of the section. The way select module 304, in other embodiments, can use the constrained RGN or pseudo-RGN to select any sub-section of the resource to be prioritized or partitioned.

The section index 306 and way index 308, after generation, are used to index to the P-LRU 310, which is the particular bank of the memory.

Figure 4:
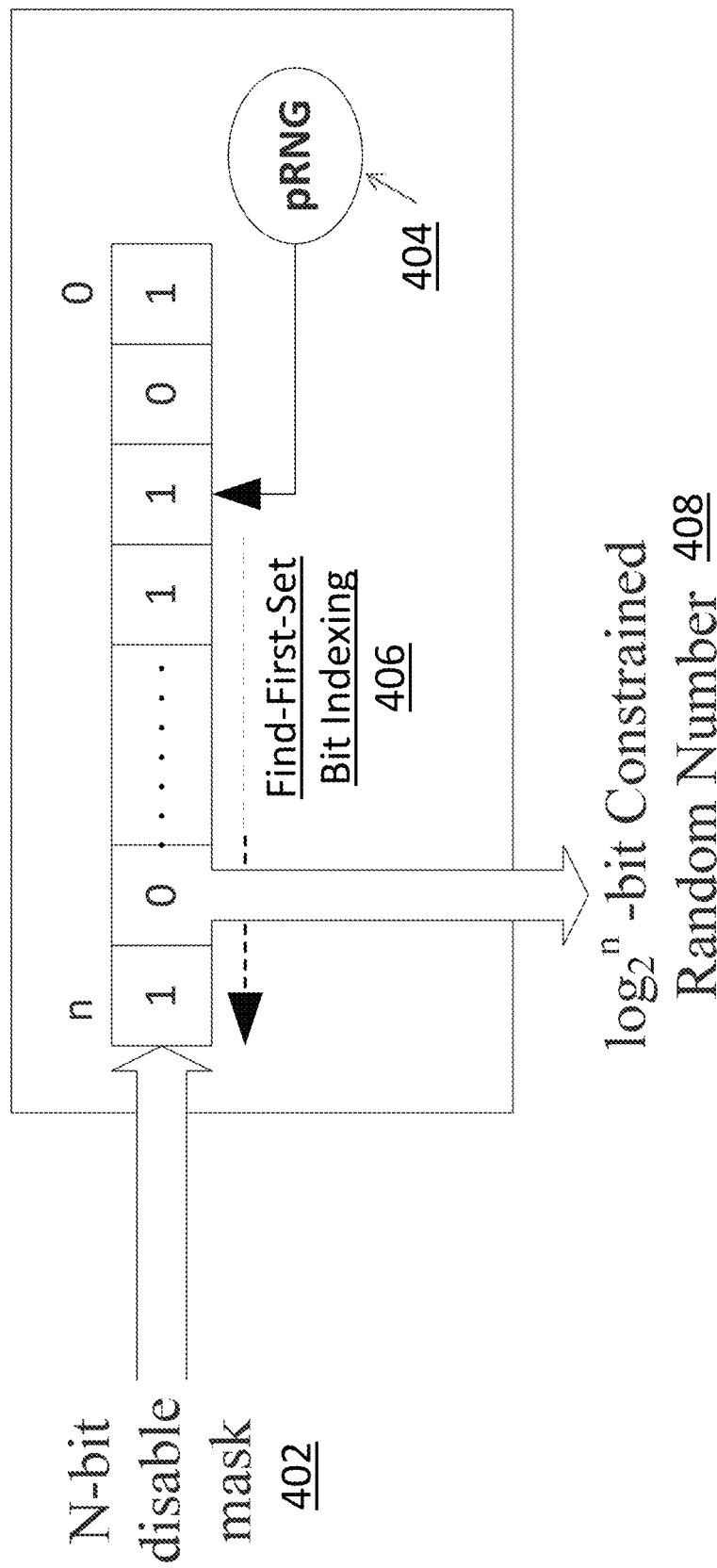
FIG. 4 is a diagram illustrating an example embodiment of generating a constrained RGN or pseudo-RGN as described by the present disclosure.

FIG. 4 is a diagram 400 illustrating an example embodiment of generating a constrained RGN or pseudo-RGN as described by the present disclosure. A RGN or pseudo-RGN 404 first indexes into an n-bit disable mask 402 as a starting position for a search. The system determines whether the position indexed by the pRGN 404 at the n-bit disable mask 402 indicates that the resource is enabled or disabled. In FIG. 4, a "1" indicates the resource is disabled and a "0" indicates that the resource is enabled, but a person of ordinary skill in the art can recognize that these values are exemplary and other values be used. In this case, the position in the n-bit disable mask 402 indexed by the pRGN 404 indicates the resource is disabled for this context. The system then cycles through the n-bit disable mask 402 in a direction indicated by the first-find-set (FFS) bit indexing 406. FIG. 4 shows the FFS bit indexing 406 increasing the index, however, a person of ordinary skill in the art can recognize that the FFS bit indexing 406 can also decrease the index, or cycle through the index in any pattern that is repeatable. Upon finding the first position of the n-bit disable mask 402 indicating the resource is allowed, the index of that position is outputted as a $\log_2(n)$-bit constrained RGN 408. For a 16-bit disable mask 402, for example, the $\log_2(n)$-bit constrained RGN 408 is a 4-bit number. In the example provided in FIG. 4, the 4-bit number is 1, or in binary, 0001. If the system cycles to an end of the bitmask (e.g., where the index is 0, n−1, or any other end of the bitmask under another indexing scheme), the system then continues FFS bit indexing 406 from the other end of the bitmask until it finds a bit indicating an enabled resource. A person of ordinary skill in the art can consider the FFS bit indexing 406 to be modular. A person of ordinary skill in the art can also recognize that in other embodiments, the mask can have data units of sizes other than a bit.

Figure 5:
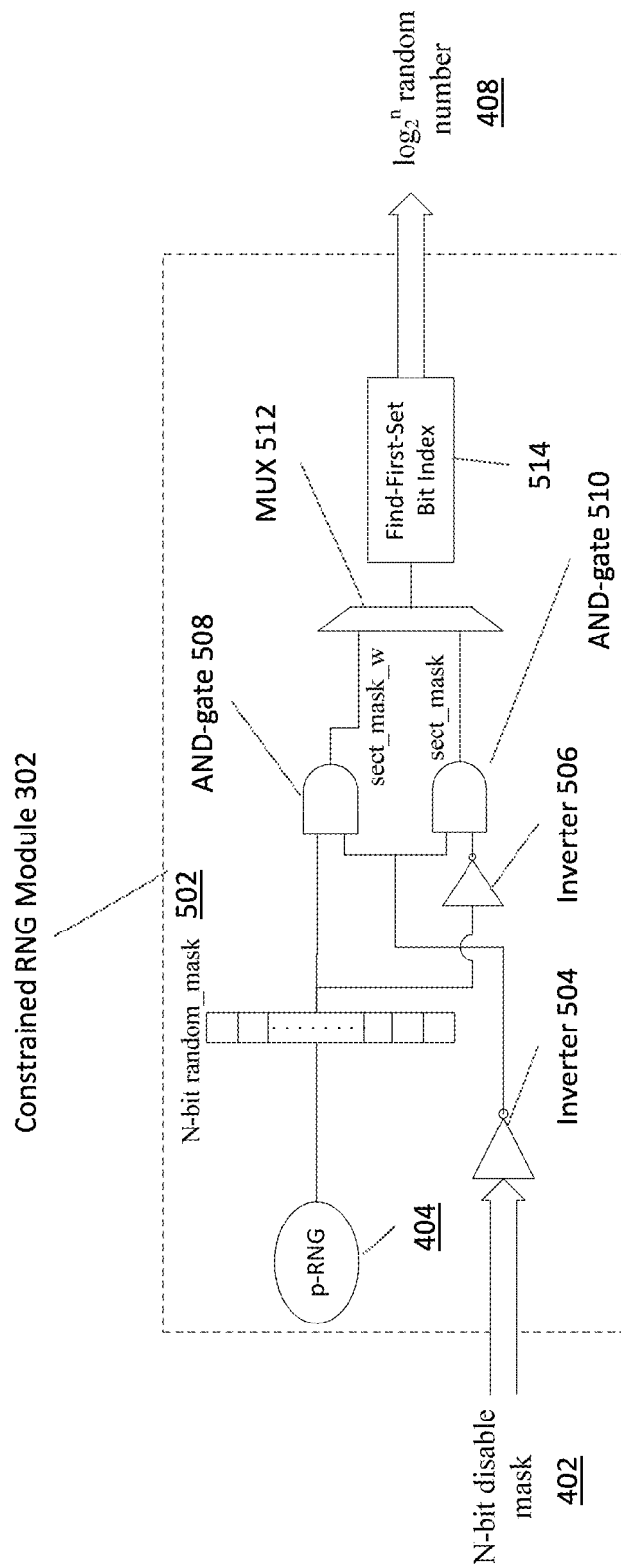
FIG. 5 is a block diagram illustrating an example embodiment of the constrained RGN module.

FIG. 5 is a block diagram 500 illustrating an example embodiment of the constrained RGN module 302 of FIG. 3. Referring to FIG. 5, the constrained RGN or pseudo-RGN module 302 receives an n-bit disable mask 402. The constrained RGN module 302 generates an n-bit random number via the p-RGN module 404, and sets a bit of the n-bit random mask 502 corresponding to at least a portion that number (e.g., sets the bit at the index indicated by a portion of the n-bit random number, such as its first 4-bits).

The constrained RGN module also logically ANDs the n-bit disable mask 402 with the inverted n-bit random mask 502, producing an n-bit mask (sect_mask), with bits set on left-side of the location of n-bit random number, if the n-bit disable mask indicated that location is enabled.

The constrained RGN module 302 inverts both the n-bit disable mask 402 and the n-bit random mask 502 at inverters 504 and 506, respectively. The constrained RGN module 302 then logically ANDs the n-bit random mask 502 with the inverted n-bit disable mask 402 at AND-gate 508, resulting in an "wrapped" n-bit mask (sect_mask_w) with bits set on right-side of the location of the n-bit random number, if the n-bit disable mask indicates that location is enabled.

A multiplexer 512 then selects between the two masks (sect_mask_w and sect_mask) and outputs the selected mask to a FFS Bit Index module 514. The FFS Bit Index Module 514 cycles through the mask to determine the first free resource, as described above, for example, in relation to FIG. 4. The FFS Bit Index Module 514 outputs a $\log_2(n)$ random number 40, which also serves as the output of the constrained RGN module 302.

Figure 6:
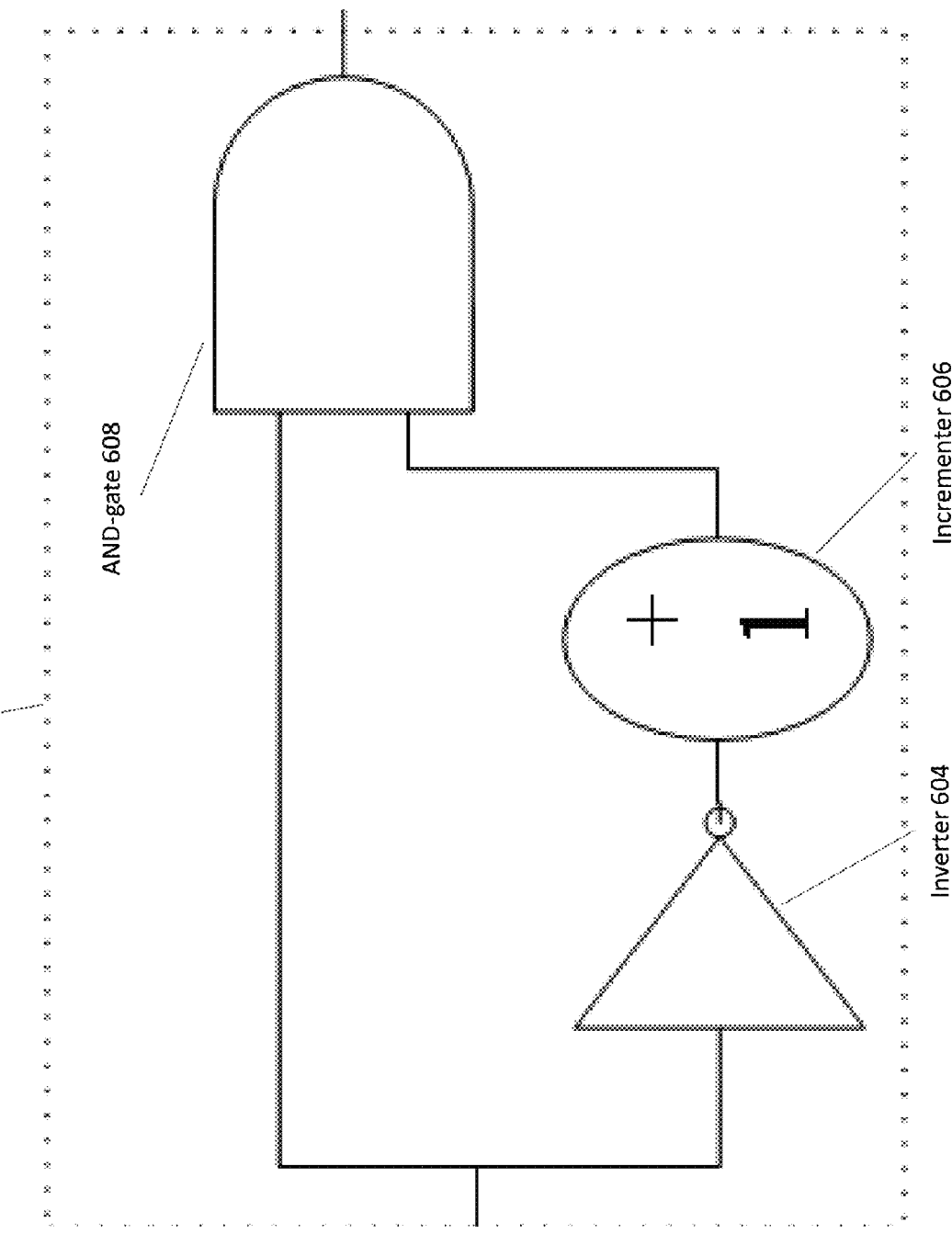
FIG. 6 is a block diagram illustrating an example embodiment of the FFS Bit Index Module employed by the present disclosure.

FIG. 6 is a block diagram 600 illustrating an example embodiment of the FFS Bit Index Module 514 employed by the present disclosure. The FFS Bit Index Module 514 includes an inverter 604 operatively coupled to an incrementer 606, which is operatively coupled to an AND-gate 608. The inverter 604 and AND-gate 608 receive the same mask input from the constrained RGN module. The incrementer 606 increases the index of the mask being tested for allowability.

Figure 7:
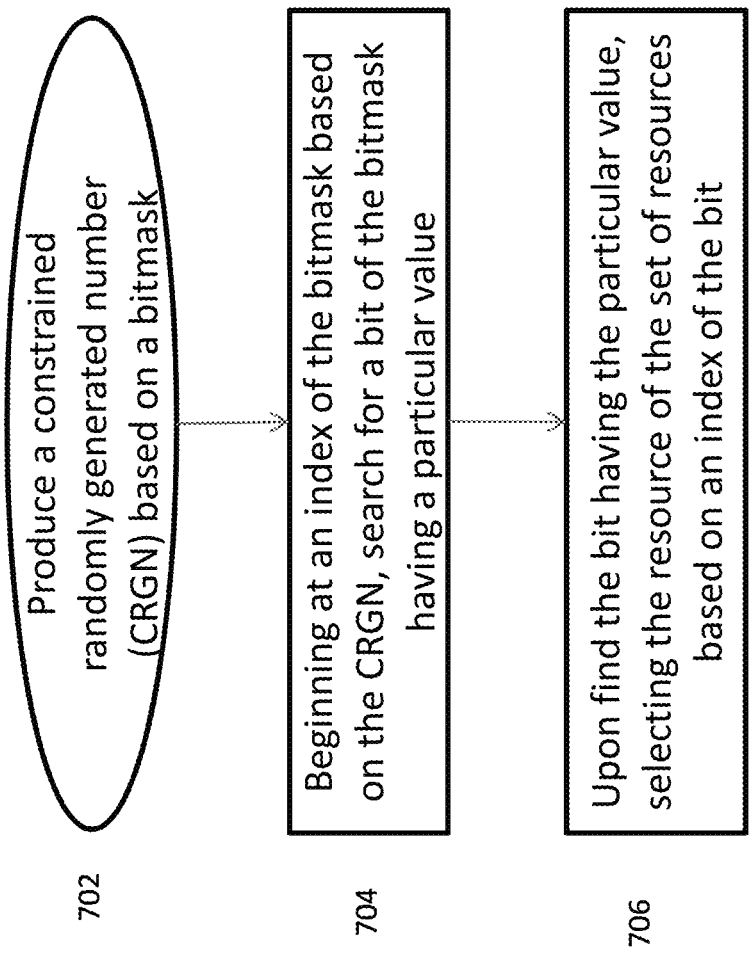
FIG. 7 is a flow diagram illustrating an example embodiment of a process implementing the present disclosure.

FIG. 7 is a flow diagram 700 illustrating an example embodiment of a process implementing the present disclosure. The process begins by producing a randomly generated number (RGN) based on a bitmask (702). A person of ordinary skill in the art can recognize that the RGN can also be a constrained pseudo-randomly generated number. Then, beginning at an index of the bitmask based on the CRGN, the process searches for a bit of the bitmask having a particular value (704). The particular value, for example, can be a value indicating that the resource is allowable in a corresponding section. Then, the process, upon finding the bit having the particular value, selects the resource of the set of resources based on an index of the bit (706).

Figure 8:
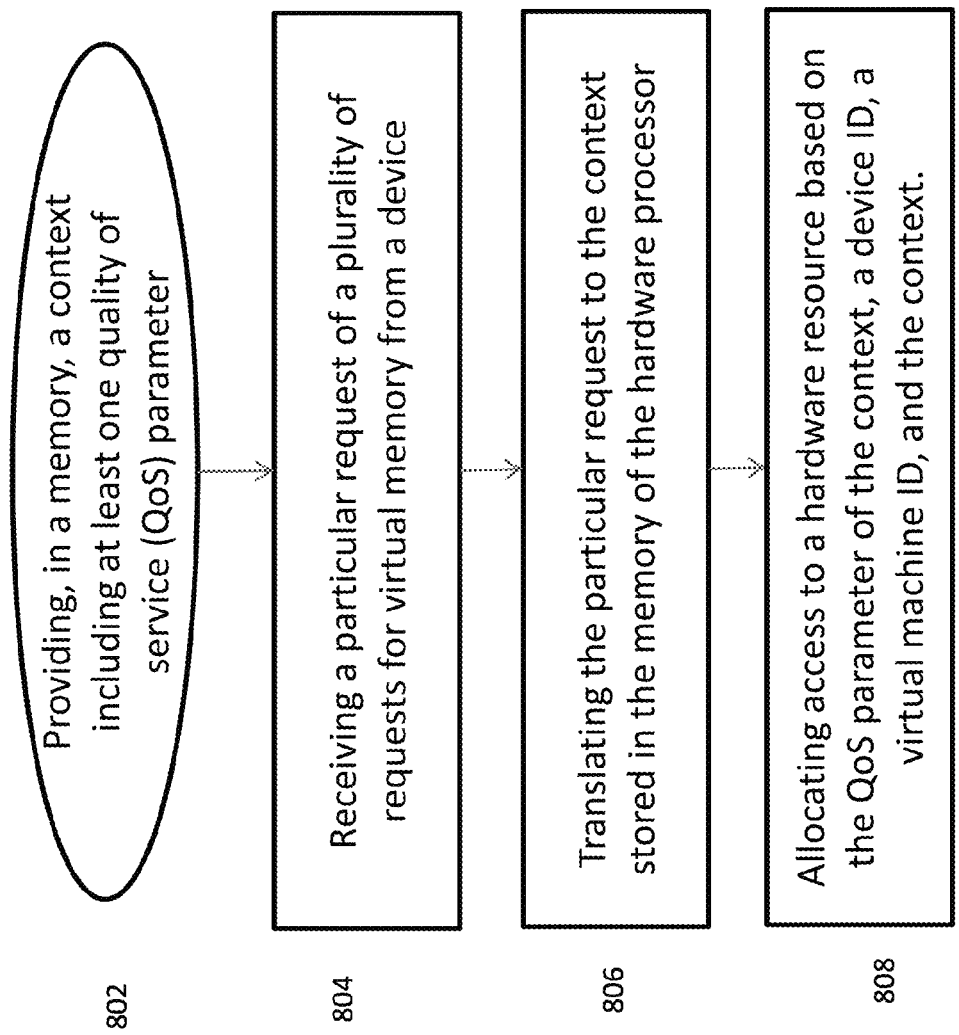
FIG. 8 is a flow diagram illustrating an example embodiment of a process implementing the present disclosure.

FIG. 8 is a flow diagram 800 illustrating an example embodiment of a process implementing the present disclosure. The process begins by providing, in a memory, a context including at least one quality of service (QoS) parameter (802). The process further includes receiving a particular request of a plurality of requests for virtual memory from a device (804). The process further includes translating the particular request to the context stored in the memory of the hardware processor (806). The process further includes partitioning access to a hardware resource based on the QoS parameter of the context, a device ID, a virtual machine ID, and the context (808).

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method comprising:
in a hardware processor:
generating a first randomly generated number (RGN) comprising one of a randomly generated number and a pseudo-randomly generated number;
producing a constrained randomly generated number (CRGN) based on the first RGN and a bit mask, wherein the CRGN comprises a first set of bits and a second set of bits, wherein the first set of bits are unmodified bits from the first RGN, and wherein further the second set of bits represents an index position of a located bit in the bit mask; and
outputting the CRGN to a resource selection unit configured to select a portion of a resource from a plurality of portions of the resource based on the CRGN.

2. The method of claim 1, wherein the resource is a cache memory.

3. The method of claim 2, wherein the portion of the resource is a bank of the cache memory.

4. The method of claim 1, wherein the resource is a bus.

5. The method of claim 1, wherein selecting the portion of the resource includes selecting a portion of multiplexed time of the resource.

6. The method of claim 1, wherein selecting a portion of the resource is based on the CRGN and at least one additional random or pseudo-random bit.

7. The method of claim 1, wherein producing the CRGN includes:
beginning at an index of the bit mask based on the first RGN, searching for a bit of the bit mask having a particular value, and
responsive to locating the bit having the particular value, producing the CRGN based on the index position of the bit having the particular value.

8. The method of claim 1, further comprising accessing the bit mask is from a context file.

9. A system comprising:
a memory management unit; and
a hardware processor configured to
generate a first randomly generated number (RGN) comprising one of a randomly generated number and a pseudo-randomly generated number,
produce a constrained randomly generated number (CRGN) based on the first RGN and a bit mask, wherein the CRGN comprises a first set of bits and a second set of bits, wherein the first set of bits are unmodified bits from the first RGN, and wherein further the second set of bits represents an index position of a located bit in the bit mask, and
output the CRGN to the memory management unit;
wherein the memory management unit is configured to select a portion of a resource of from a plurality of portions of the resource based on the CRGN.

10. The system of claim 9, wherein the resource is a cache memory.

11. The system of claim 9, wherein the portion of the resource is a bank of the cache memory.

12. The system of claim 9, wherein the resource is a bus.

13. The system of claim 9, wherein the memory management unit is further configured to select the portion of the resource by selecting a portion of multiplexed time of the resource.

14. The system of claim 9, wherein the memory management unit is further configured to select a portion of the resource based on the CRGN and at least one additional random or pseudo-random bit.

15. The system of claim 9, wherein the hardware processor is further configured to produce the CRGN by:
beginning at an index of the bit mask based on the first RGN, searching for a bit of the bit mask having a particular value, and
responsive to locating the bit having the particular value, producing the CRGN based on the index position of the bit having the particular value.

16. The system of claim 9, wherein the hardware processor is further configured to access the bit mask from a context file.

17. The method of claim 1, wherein the first set of bits comprise upper m-n bits of the CRGN, and wherein second set of bits comprise lower n-bits of the CRGN.

18. The method of claim 17, wherein the located bit correspond to a particular bit value in the bit mask.

19. The method of claim 18, wherein the particular bit value indicates accessibility to the portion of the resource.

* * * * *